Patented May 20, 1952

2,597,171

UNITED STATES PATENT OFFICE 2,597,171

CHLORINE CONTAINING CONDENSATION PRODUCTS OF PHENOLS AND SULFONATED ACETALDEHYDES

Julian A. Otto, Long Island City, and Everett E. Gilbert, Flushing, N. Y., assignors to Allied Chemical & Dye Corporation, New York, N. Y., a corporation of New York No Drawing. Application June 8, 1949, Serial No. 97,914

17 Claims. (Cl. 260—49)

This invention relates to the preparation of novel products particularly useful as germicides and to methods for the preparation and application of such products especially for control of paper mill slime.

Pulp and paper mill systems furnish a fertile field for microbiological activity and growth of micro-organisms, many varieties of which are found in all such systems. Slime, a gelatinous mass which may form at any point in a pulp or paper mill system, is the result of the growth of large numbers of these micro-organisms. Such slime formation gives rise to various disagreeable operational difficulties and serious economic problems, and its control is accordingly a matter of vital concern to the industry.

Under favorable growth conditions, large quantities of slime form in a relatively short time and these deposits, upon aging, become loosened from their places of attachment and are carried into the paper making machine with the pulp or paper fibers. This loose slime may then be deposited on such fibers, causing holes to be formed in the finished paper sheet, as well as improper texture, disagreeable odor, off-color and improper drying and sizing of the paper product. Further, slime formation results in clogging of the pulp and paper processing equipment, and is also responsible for actual stock loss. Paper slime accumulates rapidly and it is accordingly necessary to control or check its growth in the early stages in order to achieve satisfactory mill operation and obtain an acceptable product.

The control slime, various bactericidal and fungicidal agents are periodically introduced into the mill system in concentrations sufficient to inhibit the growth of the particular micro-organisms which are inducing the slime formation. Agents now in use for this purpose include trichlorophenols, pentachlorophenols, chlorinated isopropyl phenols, metallic salts, e. g. the sodium salt, of such chlorinated phenols, organomercurial compounds and quaternary ammonium compounds. Despite the number of such agents now on the market, most of these compounds are subject to various disadvantages limiting their use. The primary difficulty is that most of these compounds are more or less specific in their performance, each compound being effective at best against only a limited number of micro-organisms. Further, some of these agents such as pentachlorophenol have poor solubility in water and are extremely irritating and unpleasant to handle, while organo-mercurials must be used with caution particularly when the paper stock is to be utilized in the manufacture of food packaging products.

One object of the invention is the provision of novel products or compositions of matter having useful properties. Another object is to prepare improved chemical products particularly beneficial as germicides. Another aim of the invention is to provide inexpensive and generally water-soluble products, effective for control of pulp and paper mill slime. Another object is the provision of suitable processes for economical commercial preparation of the aforementioned products with facility using readily available equipment. The invention further aims to provide processes for effectively treating pulp with the aforementioned products during processing in pulp and paper mills, for control of slime. Other objects and advantages of the invention will appear hereinafter.

In pursuance of the above noted objects, we have discovered a series of new and valuable chlorine containing products obtained by condensing in the presence of an acid condensing agent, a soluble acetaldehyde disulfonate or a soluble monochloroacetaldehyde disulfonate with a monohydroxy phenol of the benzene series having one hydrogen atom in at least one of the positions ortho and para to the hydroxyl group and containing from 0 to 3 nuclear chlorine atoms, the amount of phenol compound reacted being at least one mol per mol of disulfonate compound. When neither the phenol nor the acetaldehyde disulfonate reactant contains chlorine, the condensation product formed is then chlorinated, although such chlorination may likewise be applied to condensation products produced in the above manner wherein either or both of the reactants contain chlorine. The chlorine containing products formed in accordance with the invention are generally water-soluble and possess valuable properties particularly with respect to germicidal activity in control of paper mill slime.

As phenols and chlorophenols suitable for the purposes of the invention are phenol itself, alkyl derivatives thereof including mono and polyalkyl phenols containing not more than 8 substituent carbon atoms, and nuclear chlorine substitution products of such phenols, there being at least one hydrogen atom in ortho or para position to the hydroxyl group in all of the phenols. Specific illustrations of the various phenols which may accordingly be employed include phenol; methyl, ethyl, propyl, isopropyl, butyl, isobutyl, tertiary butyl, amyl, tertiary amyl, hexyl, heptyl, octyl or tertiary octyl phenol; xylenols such as 2,3-, 3,4- or 2,6-dimethyl phenol; methyl propyl phenols; monochlorophenols; the various isomeric dichlorophenols, e. g. 2,4-dichlorophenol and 2,5-dichlorophenol; the various isomeric trichlorophenols having at least one hydrogen atom ortho or para to the hydroxyl group, e. g. 2,4,5 - trichlorophenol, 2,3,6 - trichlorophenol or 2,3,5-trichlorophenol; nuclear monochloro alkyl or polyalkyl phenols having at least one hydrogen atom ortho or para to the hydroxyl group such as o-chloro p-tertiary butyl phenol, m-chloro p-tertiary octyl phenol and 2,3-dimethyl-6-chlorophenol; nuclear dichloro mono and polyalkyl phenols having at least one hydrogen atom in ortho or para position to the hydroxyl group, e. g. 2,3-dichloro 4-ethyl phenol, 2,5-dichloro 4-tertiary butyl phenol and 2,3-dimethyl-5,6-dichloro phenol; and nuclear trichloro alkyl phenols having one hydrogen atom in ortho or para position to the hydroxyl group, e. g. 2,3,5-trichloro 4-tertiary butyl phenol. Mixtures of the various phenols may also be utilized such as mixtures of o-, m- and p-cresols, mixtures of chlorinated and unchlorinated phenols, and mixtures of different chlorinated phenols.

The soluble acetaldehyde disulfonates and monochloroacetaldehyde disulfonates utilized for reaction with the above phenols include the free acids, acetaldehyde disulfonic acid,

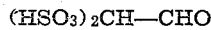

monochloroacetaldehyde disulfonic acid,

and the alkali metal salts of such acids, e. g. the potassium and sodium salts, particularly the potassium salt. The acetaldehyde disulfonates may be applied in hydrated form. Also, mixtures of acetaldehyde disulfonic acid with its monochloro derivative may be employed as well as mixtures of such free acids with the alkali metal salts thereof and mixtures of the various alkali metal salts of the acids. The expressions "acetaldehyde disulfonate" and "monochloroacetaldehyde disulfonate," as employed herein, are intended to denote either the free corresponding disulfonic acid or the salts thereof noted above.

Although the acetaldehyde disulfonates utilized as starting materials in the invention may be prepared in any known manner, it is convenient to prepare acetaldehyde disulfonic acid by reacting acetylene with oleum (of at least 45% free $SO_3$ content) in a ratio of about one mol of acetylene to every 4 mols of the free $SO_3$ content of the oleum, and then, by addition of water, hydrolyzing the oleum-acetylene reaction mixture thus formed to produce a mixture containing acetaldehyde disulfonic acid and sulfuric acid, as described in Otto and Gilbert U. S. application Serial No. 68,024, filed December 29, 1948, now U. S. Patent 2,552,421. The crude reaction mixture of hydrolysis containing sulfuric acid may then be employed directly for reaction with the above phenols in accordance with the invention, the sulfuric acid present functioning as the acid condensing agent. The monochloroacetaldehyde disulfonic acid may be prepared by chlorinating the above hydrolyzed oleum-acetylene reaction mixture containing sulfuric acid, and the crude chlorinated product also may be utilized directly for condensation with a phenol. The term "oleum-acetylene reaction mixture" noted herein is intended to denote reaction mixtures prepared by passing acetylene into oleum in the above noted proportions.

In selecting combinations of the phenol and acetaldehyde disulfonate reactants so as to produce the chlorinated condensation product, either the phenol or the acetaldehyde disulfonate or both may contain chlorine. If neither the phenol nor the acetaldehyde disulfonate contains chlorine, it is necessary to chlorinate the product of condensation thereof in order to incorporate chlorine into the final product. However, in many instances, it is preferred to further chlorinate the condensation product even if one or both of the initial reactants contain chlorine.

Thus, for example, in practice of the invention, suitable products may be formed by reacting (a) a chlorophenol with an acetaldehyde disulfonate or (b) an unchlorinated phenol with a monochloroacetaldehyde disulfonate or (c) a chlorophenol with a monochloroacetaldehyde disulfonate. Further, the condensation product produced by reaction (a), (b) or (c) may be additionally chlorinated. A preferred product of the invention involves condensation of phenol with an acetaldehyde disulfonate to give an unchlorinated condensation product followed by chlorination thereof.

In carrying out the condensation reaction, the phenol and acetaldehyde disulfonate compounds are mixed in a ratio of at least one mol of the phenol per mol of acetaldehyde disulfonate, and as much as 5 mols of the phenol may be employed per mol of the acetaldehyde disulfonate. However, a molar ratio of the phenol to acetaldehyde disulfonate compound of about 3 to 1, preferably 2 to 1, is generally employed. The amount of phenol compound utilized is ordinarily in excess of that amount which actually condenses with the acetaldehyde disulfonate, the quantity of the phenol thus reacting varying from 1 to 2 mols per mol of acetaldehyde disulfonate. Regardless as to how large an amount of the phenol is used, the maximum quantity of phenol which can react or condense with the disulfonate compound is 2 mols per mol of the disulfonate. On the other hand, sufficient of the phenol is employed herein to enable at least one mol thereof to condense with each mol of the disulfonate compound under the conditions of reaction.

The amount of the phenol which condenses with the acetaldehyde disulfonate compound appears to depend on the total amount of the particular phenol utilized and on the chlorine content of the two reactants. From our development work we have ascertained that generally, the amount of phenol reacting with the disulfonate increases with increase in total quantity of phenol employed and chlorine content of the reactants. For example, when employing a 3 to 1 molar ratio of phenol to unchlorinated disulfonate compound, about 1.7 mols of phenol react with each mol of the acetaldehyde disulfonate, while when using monochloroacetaldehyde disulfonate, about 1.9 mols of the phenol condense with each mol of the disulfonate. If phenol and unchlorinated acetaldehyde disulfonate compound are mixed in a ratio of 2 mols of phenol per mol of the acetaldehyde disulfonate, from about 1.4 to 1.5 mols of phenol condense with each mol of the disulfonate, whereas if phenol and monochloroacetaldehyde disulfonate are utilized in the above ratio of 2 mols of the phenol to one mol of the disulfonate, about 1.6 to 1.7 mols of the phenol condense with each mol of the acetaldehyde disulfonate.

The mixture of the phenol and the acetaldehyde disulfonate to be condensed is subjected to a sufficiently elevated temperature and for a period of time such as to effect reaction between the phenol and the acetaldehyde disulfonate to form the desired product. The condensation reaction is carried out in the presence of an acid condensing agent such as hydrochloric, sulfuric or phosphoric acid. Temperature of reaction is not critical, but is ordinarily maintained sufficiently high to cause rapid reaction without undue decomposition, and usually ranges from 25 to 135° C. When using dilute acid as condensing agent the reaction mixture is generally heated to 90–125° C. However, when strong acid condensing agents are utilized, e. g. sulfuric acid of 90 to 100% strength or oleum, lower temperatures of condensation may be employed usually ranging from 30 to 75° C. A considerable amount of acid condensing agent is employed, usually substantially in excess of the molecular equivalent of acetaldehyde disulfonate compound present. Time of reaction may vary greatly, say from about 1 to 15 hours, depending principally upon the temperature employed.

On completion of the reaction, if the condensation product contains chlorine as result of the presence of chlorine in either of the reactants, and no further chlorination of the condensation product is desired, unreacted phenol compound is removed by any suitable means, e. g. solvent extraction or steam distillation, and the acid condensing agent may be neutralized or removed by distillation from the reaction mixture. The resulting product containing mixture or solution may then be dried at temperatures preferably ranging from 65 to 120° C., most desirably at about 90 to 110° C.

If the condensation product, whether or not it contains chlorine, is to be further chlorinated, excess phenol and condensing agent are generally removed first, the reaction mixture containing condensation product is then diluted with water and chlorine gas is passed into the resulting mixture for a period of time sufficient to incorporate the desired amount of chlorine into the condensation product. This chlorination reaction is ordinarily made to take place in the absence of catalysts. From experience we have ascertained that the amount of chlorine which reacts with the condensation product obtained by condensing phenol with an acetaldehyde disulfonate or a monochloroacetaldehyde disulfonate, varies generally from about 200 to 400 grams per gram mol of acetaldehyde disulfonate compound employed in producing the condensation product. Usually, from 250 to 350 grams of chlorine thus react per gram mol of disulfonate compound particularly when the disulfonate is unchlorinated. The temperature of the chlorination reaction is not critical but may vary from 0° to 65° C. with temperature of 25 to 55° C. preferably employed.

On completion of the chlorination reaction any water-insoluble compounds which may have formed as by-products during the reaction are removed by extracting with a suitable solvent, e. g. benzene, and the resulting aqueous solution containing the chlorinated product may then be dried at 65 to 120° C., preferably at 90 to 110° C.

The phenol-acetaldehyde disulfonate condensation products produced in accordance with the invention are not simple chemical compounds, but are polymeric in nature and are probably complex mixtures of several compounds, the exact chemical structures of which are unknown. Subsequent chlorination of such condensation products further complicates the structure of the final product especially since the chlorine atoms introduced into the condensation product during this chlorination may attach themselves to both the aliphatic and aromatic portions of such product. The sulfonate groups introduced into the condensation product as a result of their presence in the acetaldehyde disulfonate reactant, become linked only to the aliphatic portions of such product. The dried chlorinated products produced in accordance with the invention are amorphous, are generally of good water solubility and may range in color from light pink through reddish brown to black. Instead of drying the chlorine containing products produced herein, these products may be marketed in solution form with or without neutralization of any acid present therein.

While a substantial proportion of the products produced in accordance with the principles of the invention are very water soluble, some of the products, for example those obtained from condensations using highly alkylated phenols or phenols of high chlorine content such as trichlorophenols, may be of somewhat limited solubility. Products of this latter type may be conveniently rendered more soluble, if desired, by forming a metal salt of the product, e. g. by reaction with sodium hydroxide. Alternatively, products of limited solubility may be dissolved in solvents such as aqueous di-isopropanolamine, and the resulting solution may be applied satisfactorily for fungicidal or slime control purposes.

The following examples are illustrative of the invention, all quantities being expressed in parts by weight:

*Example 1.*—To 298 parts of potassium acetaldehyde disulfonate monohydrate were added 188 parts of phenol and 1000 parts of constant boiling (20%) hydrochloric acid. The molar proportion of phenol to potassium acetaldehyde disulfonate compound employed constituted a ratio of about 2 to 1. The mixture was heated at 110° C. under reflux for about 3 hours with agitation. In the neighborhood of 1.5 mols of phenol condensed with each mol of the acetaldehyde disulfonate, and on completion of the reaction, about 50 parts of unreacted phenol and about 850 parts of constant boiling hydrochloric acid were removed by distillation. The still residue was then diluted with about 250 parts of water, and about 300 parts of chlorine were passed into the resulting aqueous solution at a temperature of 50 to 55° C. Following chlorination, the reaction mixture was extracted with 200 parts of benzene yielding about 65 parts of water-insoluble by-products consisting principally of trichlorophenol. The remaining product containing mixture was then evaporated to dryness at 90–100° C., yielding about 400 parts of a chlorinated acetaldehyde disulfonate-phenol product which was dark brown in color and highly water-soluble.

*Example 2.*—About 33 parts of potassium monochloroacetaldehyde disulfonate and 20 parts of phenol, corresponding to a ratio of about 2.2 mols of phenol per mol of acetaldehyde disulfonate compound, were mixed with 95 parts of hydrochloric acid (36%). The mixture was heated under reflux at a temperature of 100–110° C. for about 1.5 hours. About 1.7 mols of phenol condensed per mol of chlorinated acetaldehyde disulfonate. The resulting reaction mixture was then evaporated to dryness. The solid product obtained was pulverized and ether was then added to form a slurry, after which the ether extract containing about 3 parts of unreacted phenol was removed. The remaining material was then dried at 90–100° C., yielding 50 parts of a light pink amorphous product very soluble in water.

*Example 3.*—322 parts of potassium monochloroacetaldehyde disulfonate and 282 parts of phenol, corresponding to a molar ratio of approximately 3 mols of phenol to one mol of the acetaldehyde disulfonate, were mixed with 1400 parts of 20% hydrochloric acid and the mixture heated at 110° C. under reflux for 3 hours with efficient agitation. On completion of the reaction, excess phenol and most of the hydrochloric acid were removed by distillation, collecting about 1390 parts of distillate containing 104 parts of phenol. Thus, about 1.9 mols of phenol had condensed with each mol of the acetaldehyde disulfonate compound. To the distillation residue containing the condensation product were added 500 parts of water, and the resulting solution was chlorinated by passing chlorine gas into the solution maintained at a temperature ranging between 30 and 35° C., about 280 parts of chlorine being taken up in the reaction. The resulting reaction mixture separated into two layers consisting of an aqueous acid layer and an organic product containing layer in the form of a viscous syrupy mass at room temperature. The organic layer, constituting 624 parts, was separated from the aqueous layer and was then dried on a steam bath at about 100° C. and finally in a vacuum desiccator to obtain about 456 parts of a water-soluble readily pulverizable product of reddish brown color.

*Example 4.*—About 33 parts of potassium monochloroacetaldehyde disulfonate, 36 parts of 2,4-dichlorophenol and 100 parts of sulfuric acid (95 to 96%), were mixed with vigorous agitation and heated to 45° C., the molar ratio of phenol compound to acetaldehyde disulfonate compound employed being about 2.2 to 1. The reaction temperature rose to 57° C. without further external heating and then gradually dropped back to about 25° C., total reaction time being about 1.5 hours. The sulfuric acid layer was decanted from the putty-like solid material that separated out, and the product was then neutralized with a potassium hydroxide solution and the resulting mixture extracted with ether. After removing the ether layer, the bottom product layer was evaporated to dryness at about 100° C. and pulverized to yield as product 31 parts of a dark brown powder having high water solubility.

*Example 5.*—To 298 parts of potassium acetaldehyde disulfonate monohydrate were added 225 parts of p-tertiary butyl phenol and 1500 parts of constant boiling hydrochloric acid (20%), the molar proportion of phenol compound to the acetaldehyde disulfonate being about 1¾ to 1. The mixture was heated under reflux at a temperature of 110° C. with good agitation for 11 hours. About 1.6 mols of the phenol condensed per mol of the acetaldehyde disulfonate. On cooling, the mixture was shaken with about 860 parts of ether. Three layers formed, the bottom layer containing most of the hydrochloric acid, the top ether layer containing about 17 parts of unreacted p-tertiary butyl phenol and the middle layer comprising viscous product with some hydrochloric acid and ether. The various layers were separated off and the middle product layer was heated on a steam bath to remove ether and hydrochloric acid, and the residue was then mixed with about 900 parts of water. The resulting mixture was reacted at a temperature of 45 to 50° C. under agitation with 222 parts of chlorine. The reaction mixture separated into two layers, the bottom product layer being drawn off and dried on a steam bath at about 100° C. to remove hydrochloric acid. The dried material was then slurried with about 300 parts of water and the mixture neutralized to a pH of 5, followed by drying again on a steam bath and finally in a vacuum desiccator to give 360 parts of a black amorphous product readily soluble in water.

*Example 6.*—167 parts of potassium monochloroacetaldehyde disulfonate were mixed with 150 parts of p-tertiary butyl phenol, corresponding to a molar proportion of 2 mols of the phenol compound to 1 mol of the chlorinated acetaldehyde disulfonate. About 750 parts of hydrochloric acid (20%) were added to the mixture and the resulting mixture heated under reflux at 110° C. with good agitation for 7.5 hours. On cooling, a viscous material settled out of the reaction mixture. About 360 parts of ether were then added to the reaction mixture, causing separation of an aqueous bottom layer and a top ether layer containing product. The top layer was removed, the ether evaporated and the product dried at 90–100° C., to remove hydrochloric acid. A water slurry of the product was then formed which was neutralized to a pH of 6 with potassium hydroxide. After extracting the unreacted p-tertiary butyl phenol from the slurry with benzene, the product containing slurry was dried, yielding about 178 parts of a water-soluble material which could be easily pulverized.

*Example 7.*—About 30 parts of potassium acetaldehyde disulfonate monohydrate were added with cooling to 110 parts of 20% oleum, and about 40 parts of 2,4,5-trichlorophenol were then added to this mixture, the molar proportion of phenol compound to acetaldehyde disulfonate employed being about 2 to 1. The reaction mixture was then heated at a temperature of 70° C. with stirring for about 5 hours, about 1.4 mols of the phenol condensing with each mol of the acetaldehyde disulfonate. 100 parts of water were then added to the reaction mixture and steam passed into the reactor to remove about 12 parts of unreacted trichlorophenol as distillate. The product separated as a solid precipitate from the acid solution, was filtered and then washed with distilled water. The product mixture was then neutralized to a pH of 6 using potassium hydroxide, followed by drying of the neutralized material on a steam bath, 25 parts of the dried product being obtained.

The product produced in Example 1 was tested against several of the common slime forming micro-organisms generally present in pulp and paper mill systems. Such micro-organisms consist of both bacteria and fungi. In tests on two of the bacteria type organisms most commonly occurring in pulp and paper mill slime, *Escherichia coli* and *Aerobacter aerogenes,* the effective growth inhibiting concentrations of the product of Example 1 against *Escherichia coli* ranged from 200 to 300 parts per million parts of dilution, and against *Aerobacter aerogenes* varied from 500 to 1000 parts per million. When a commercial germicide containing about 75% sodium pentachlorophenate and additional quantities of the sodium salts of other chlorophenols was applied against the two types of bacteria noted above, more than 1000 parts of this commercial germicide per million parts of dilution were required to obtain the same growth inhibiting effect against either of these two bacteria, thus indicating the superior bactericidal potency of the product of Example 1 as compared to one of the most widely employed germicides now available for control of paper mill slime.

The product of Example 1 was also tested against two fungus type micro-organisms often associated with pulp and paper mill slime, *Aspergillus flavus* and *Aspergillus niger*. It was observed that growth of *Aspergillus flavus* was inhibited when employing a concentration of 100 to 200 parts of the product of Example 1 per million parts of dilution, with inhibition of *Aspergillus niger* obtained by application of from 200 to 1000 parts of the product of Example 1 per million parts of dilution.

In commercial practice for control of slime formation in pulp and paper mills, the products of the invention, e. g. the product of Example 1, may be applied to the pulp or paper at any stage during the processing thereof. Ordinarily, our slime control agents are most conveniently added to the pulp mill beaters. The products of the invention when used for this purpose may be applied to the pulp in the form of a powder which may be packaged in small amounts, or they may be applied in the form of small balls or in the form of a solution or slurry of the active ingredient. Such solutions or slurries may be made up in concentrations ranging, for example, from 10 to 50% of active ingredient. The amount of slime control agent of the invention which is employed may vary considerably depending upon the particular slime conditions encountered. Usually, from 0.1 to 1 lb., preferably 0.2 to 0.5 lb., of our products may be employed per ton of pulp on the dry basis. The products of the invention may be utilized for slime control alone or in mixtures, as well as in conjunction with other commercial germicides now on the market. The term "pulp" used herein is intended to denote virgin wood pulp as well as pulp obtained from reclaimed paper stock.

From the foregoing, it is apparent that valuable chlorinated products are produced in accordance with the invention, which products are particularly effective as germicides in controlling pulp and paper mill slime. The products of the invention, such as that of Example 1, have the advantage of possessing both fungicidal and bactericidal properties, and thus exhibit inhibiting power on the majority of micro-organisms present in pulp and paper mill slime, whereas conventional germicides are generally so selective in their action against the micro-organisms present in such slime that complete slime control requires the use of several such agents. Further, the products of the invention are, or can readily be made, very soluble in the acid water used for pulp processing, where as other commercial germicides are practically insoluble and are of greatly decreased effectiveness under such conditions. Also, the presence of sulfonate groups in the products of the invention confers wetting properties upon such products and enables them to penetrate the pulp fibers and cling thereto. Accordingly, the products of the invention show a great affinity for the pulp and "exhaust" upon it from the water solution to afford increased protection against slime formation, while, for example, ordinary halogenated phenols such as pentochlorophenol "exhaust" relatively poorly.

While the novel products of the invention are noted to be of particular value as germicides, bactericides and fungicides, these products have other valuable uses including their application as insecticides and mothicides. Thus, for example, the product of Example 7 exhibits effectiveness both as a moth proofing agent and as a fungicide. In tests of this product as a fungicide against brown rot of stone fruits and early blight of potato, inhibition of such fungus growths was attained in dilutions as low as 10 parts of active ingredient per million. When tested as a mothproofing agent against black carpet beetle larvae, upon exposure of 20 of such larvae for a total period of 5 weeks to cloth treated with the compound of Example 7 in conventional concentrations, only a trace of feeding was noted at the end of 3 weeks, and after 5 weeks only slight nap feeding was observed. A similar untreated cloth exposed to the same conditions contained holes at the end of the 5 week period, indicating heavy feeding.

Since various changes and modifications may be made in the invention without departing from the spirit thereof, the invention is to be taken as limited only by the scope of the appended claims.

We claim:

1. The method of preparing a chlorine containing product which comprises condensing at 25–135° C. in the presence of an acid condensing agent, an aldehyde compound of the group consisting of acetaldehyde disulfonic acid, monochloroacetaldehyde disulfonic acid and the alkali metal salts thereof, with a chlorinated monohydroxy phenol of the benzene series containing from 1 to 3 nuclear chlorine atoms and having one hydrogen atom in at least one of the positions ortho and para to the hydroxyl group, from 1 to 2 mols of phenol compound being reacted per mol of said aldehyde compound.

2. The method of preparing a chlorine containing product which comprises condensing at 25–135° C. an alkali metal acetaldehyde disulfonate with 2,4,5-trichlorophenol, from 1 to 2 mols of said phenol being reacted per mol of said acetaldehyde and the condensation reaction taking place in the presence of an acid condensing agent.

3. The method of preparing a water-soluble chlorine containing product which comprises condensing at 25–135° C. an alkali metal monochloroacetaldehyde disulfonate with phenol, from 1 to 2 mols of phenol compound being reacted per mol of said monochloroacetaldehyde disulfonate, the condensation reaction taking place in the presence of an acid condensing agent, and chlorinating the resulting reaction mixture.

4. The method of preparing a chlorine containing product which comprises condensing in the presence of an acid condensing agent, a member of the group consisting of acetaldehyde disulfonic acid, monochloroacetaldehyde disulfonic acid and the alkali metal salts thereof with a monohydroxy phenol of the benzene series having one hydrogen atom in at least one of the positions ortho and para to the hydroxyl group and containing from 0 to 3 nuclear chlorine atoms, from 1 to 2 mols of phenol compound being reacted per mol of aldehyde compound, and chlorinating the condensation product when said phenol and said aldehyde compound contain no chlorine in the molecule.

5. The method of preparing a chlorine containing product which comprises condensing in the presence of an acid condensing agent, a member of the group consisting of acetaldehyde disulfonic acid, monochloroacetaldehyde disulfonic acid and the alkali metal salts thereof with a monohydroxy phenol of the benzene series having one hydrogen atom in at least one of the positions ortho and para to the hydroxyl group and containing from 0 to 3 nuclear chlorine atoms and 0 to 8 substituent alkyl carbon atoms, from 1 to 2 mols of phenol compound being reacted per mol of aldehyde compound, at least one of the two reactants containing at least one chlorine atom in the molecule.

6. The method of preparing a chlorine containing product which comprises condensing in the presence of an acid condensing agent, a member of the group consisting of acetaldehyde disulfonic acid, monochloroacetaldehyde disulfonic acid and the alkali metal salts thereof with a monohydroxy phenol of the benzene series having one hydrogen atom in at least one of the positions ortho and para to the hydroxyl group and containing from 0 to 3 nuclear chlorine atoms and 0 to 8 substituent alkyl carbon atoms, from 1 to 2 mols of phenol compound being reacted per mol of aldehyde compound, and chlorinating the resulting reaction mixture.

7. The method of preparing a chlorine containing product which comprises condensing at 25–135° C. in the presence of an acid condensing agent, monochloroacetaldehyde disulfonic acid with a monohydroxy phenol of the benzene series having one hydrogen atom in at least one of the positions ortho and para to the hydroxyl group and containing from 0 to 3 nuclear chlorine atoms and not more than one alkyl group, said alkyl group having not more than 8 carbon atoms, from 1 to 2 mols of phenol compound being reacted per mol of said disulfonic acid.

8. The method of producing a water-soluble chlorine containing product which comprises heating phenol with an alkali metal acetaldehyde disulfonate at 25–135° C. in the presence of an acid condensing agent, from 1 to 5 mols of phenol being employed per mol of acetaldehyde disulfonate compound, with 1 to 2 mols of phenol reacting per mol of said acetaldehyde disulfonate, removing unreacted phenol and chlorinating the resulting reaction mixture.

9. The method of producing a water-soluble chlorine containing product which comprises heating phenol with acetaldehyde disulfonic acid at 25–135° C. in the presence of a substantial proportion of an acid condensing agent, from 1 to 3 mols of phenol being employed per mol of said disulfonic acid, removing unreacted phenol after condensation of 1 to 2 mols of phenol per mol of acetaldehyde disulfonate, and chlorinating the resulting mixture at 0–65° C. so as to react 200 to 400 grams of chlorine per gram mol of said disulfonic acid condensed.

10. The method of preparing a water-soluble chlorine containing product having bactericidal and fungicidal properties which comprises heating phenol with potassium acetaldehyde disulfonate at 90–125° C. in the presence of a substantial proportion of an acid condensing agent, about 2 mols of phenol being employed per mol of acetaldehyde disulfonate, removing unreacted phenol after condensation of 1.4 to 1.6 mols of phenol per mol of the acetaldehyde disulfonate, passing 250 to 350 grams of chlorine per gram mol of said acetaldehyde disulfonate through the resulting reaction mixture and drying the chlorinated product thus formed at 90–110° C.

11. The method of controlling pulp and paper mill slime which comprises subjecting pulp during processing to the action of a chlorine containing product produced by the process of claim 4.

12. The method of controlling pulp and paper mill slime which comprises treating pulp and paper mill fluids, during processing, with a product obtained by the method defined in claim 10 the amount of said product employed constituting between 0.1 and 1 lb. per ton of pulp on a dry basis.

13. The method of preparing a chlorine containing product which comprises condensing at 25–135° C. acetaldehyde disulfonic acid with a monohydroxy phenol of the benzene series having one hydrogen atom in at least one of the positions ortho and para to the hydroxyl group and containing from 0 to 3 nuclear chlorine atoms and not more than one alkyl group, said alkyl group having not more than 8 carbon atoms, from 1 to 2 mols of phenol compound being reacted per mol of said disulfonic acid, the condensation reaction taking place in the presence of an acid condensing agent, and chlorinating the resulting reaction mixture.

14. The chlorine containing product produced by the process of claim 4.

15. The chlorine containing product produced by the process of claim 2.

16. The water-soluble chlorine containing product produced by the process of claim 10.

17. The method of controlling pulp and paper mill slime which comprises treating pulp and paper mill fluids, during processing, with a water-soluble chlorine containing product produced by the process of claim 9, the amount of said product employed constituting between 0.1 and 1 lb. per ton of pulp on a dry basis.

JULIAN A. OTTO.
EVERETT E. GILBERT.

REFERENCES CITED

The following references are of record in the file of this patent:

FOREIGN PATENTS

| Number | Country | Date |
|---|---|---|
| 383,189 | Germany | Oct. 11, 1923 |
| 651,646 | France | Oct. 15, 1928 |